United States Patent
Yu et al.

(10) Patent No.: US 11,662,865 B2
(45) Date of Patent: May 30, 2023

(54) ARRAY SUBSTRATE AND DRIVING METHOD, DISPLAY PANEL AND TOUCH DISPLAY DEVICE

(71) Applicant: Xiamen Tianma Micro-Electronics Co., Ltd., Xiamen (CN)

(72) Inventors: Shaowei Yu, Xiamen (CN); Ying Sun, Xiamen (CN); Yumin Xu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 477 days.

(21) Appl. No.: 16/979,182

(22) PCT Filed: Nov. 18, 2019

(86) PCT No.: PCT/CN2019/119253
§ 371 (c)(1),
(2) Date: Sep. 9, 2020

(87) PCT Pub. No.: WO2021/082098
PCT Pub. Date: May 6, 2021

(65) Prior Publication Data
US 2023/0097132 A1 Mar. 30, 2023

(30) Foreign Application Priority Data

Oct. 28, 2019 (CN) .......................... 201911028087.2

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05)

(58) Field of Classification Search
CPC ... G06F 3/0446; G06F 3/0412; G06F 3/04164
See application file for complete search history.

(56) References Cited

U.S. PATENT DOCUMENTS

| | | | |
|---|---|---|---|
| 10,664,094 B2 * | 5/2020 | Koide | G02F 1/13454 |
| 2014/0354572 A1 * | 12/2014 | Zhao | G06F 3/0412 |
| | | | 345/173 |

(Continued)

FOREIGN PATENT DOCUMENTS

| CN | 106066738 A | 11/2016 |
|---|---|---|
| CN | 106445249 A | 2/2017 |

(Continued)

*Primary Examiner* — Amit Chatly
(74) *Attorney, Agent, or Firm* — Kilpatrick Townsend & Stockton, LLP

(57) ABSTRACT

Disclosed are an array substrate and a driving method, a display panel and a touch display device. The array substrate includes: electrode column groups each including M adjacent electrode columns; touch signal lines each including a first signal line and a second signal line electrically connected to each other; M common voltage lines, M first switch control lines and first switch device groups; and M second switch control lines, second switch device groups and touch signal terminal groups. Each second switch device group includes M sub-switch device groups, each of which includes N second switch devices, and each touch signal terminal group includes N touch signal terminals. N touch signal terminals in the same touch signal terminal group are respectively electrically connected to the second terminals of N second switch devices in any sub-switch device group in the same second switch device group in a one-to-one manner.

15 Claims, 12 Drawing Sheets

(56) References Cited

U.S. PATENT DOCUMENTS

| | | | |
|---|---|---|---|
| 2016/0328075 A1* | 11/2016 | Luo | G06F 3/04164 |
| 2017/0075487 A1* | 3/2017 | Huang | G06F 3/04166 |
| 2018/0136773 A1* | 5/2018 | Chen | G02F 1/134309 |
| 2018/0307368 A1* | 10/2018 | Koide | G06F 3/04164 |
| 2019/0179467 A1* | 6/2019 | Kim | G06F 3/044 |
| 2019/0287459 A1 | 9/2019 | Liu et al. | |
| 2019/0384478 A1* | 12/2019 | Teranishi | G06F 3/04166 |
| 2021/0181916 A1* | 6/2021 | Kwon | G06F 3/0412 |

FOREIGN PATENT DOCUMENTS

| | | |
|---|---|---|
| CN | 106531108 A | 3/2017 |
| CN | 206292758 U | 6/2017 |
| CN | 109256171 A | 1/2019 |

\* cited by examiner

ARRAY SUBSTRATE AND DRIVING METHOD, DISPLAY PANEL AND TOUCH DISPLAY DEVICE

CROSS-REFERENCE OF RELATED APPLICATIONS

The present application is a national phase entry under 35 U.S.C. § 371 of International Application No. PCT/CN2019/119253, filed on Nov. 18, 2019, which claims the priority from Chinese Patent Application No. 201911028087.2, filed with the China National Intellectual Property Administration on Oct. 28, 2019 and entitled "Array Substrate and Driving Method, Display Panel and Touch Display Device", which is hereby incorporated by reference in its entirety.

FIELD

The disclosure relates to the field of display technologies, and in particular, to an array substrate and a driving method, a display panel and a touch display device.

BACKGROUND

With the development of science and technology, the manufacturing technology of display panels is becoming increasingly mature. More and more display panels are widely used in the people's daily life and work, and bring the great convenience to the people's daily life and work. The existing display panels mainly include: Liquid Crystal Display (LCD) panels, Organic Light Emitting Diode (OLED) panels, plasma display panels, etc.

In order to enlarge the display interface and enhance the beauty of the display device, increasing the display size and resolution as well as narrowing the bezel and reducing the thickness have become one of the main research and development directions. As such, size of the display panel has also become larger and larger.

SUMMARY

In view of this, the disclosure provides an array substrate and a driving method, a display panel and a touch display device to realize the narrow bezel design.

One embodiment of the present application provides an array substrate. The array substrate has a display area and a non-display area. The array substrate includes electrode column groups arranged in a first direction and touch signal lines. Each electrode column group comprises M adjacent electrode columns extending in a second direction and arranged in the first direction, and each electrode column comprises N first electrodes located in the display area, and M≥2, N≥2, and the first direction intersects with the second direction. Each touch signal line comprises a first signal line and a second signal line electrically connected to each other, and the first signal line and the second signal line of a same touch signal line are electrically connected to a same first electrode. The array substrate further includes in the non-display area M common voltage lines, M first switch control lines and first switch device groups. Each first switch device group includes M first switch devices, and in respective one electrode column group: first electrodes in a same electrode column are connected to a first terminal of a same first switch device via respective first signal lines, second terminals of respective first switch devices in a same first switch device group are respectively connected to different common voltage lines, and gates of the respective first switch devices in the same first switch device group are connected to different first switch control lines. The array substrate further includes, in the non-display area, M second switch control lines, second switch device groups and touch signal terminal groups. Each second switch device group comprises M sub-switch device groups, each of which comprises N second switch devices, and each touch signal terminal group comprises N touch signal terminals. In respective one electrode column group: respective second signal lines corresponding to the first electrodes are electrically connected to first terminals of respective second switch devices in the second switch device groups in a one-to-one manner. In a same second switch device group: gates of second switch device in a same sub-switch device group are connected to a same second switch control line, and gates of second switch devices in different sub-switch device groups are respectively connected to different second switch control lines. N touch signal terminals in a same touch signal terminal group are respectively electrically connected to second terminals of respective N second switch devices in any sub-switch device group in the same second switch device group in a one-to-one manner.

One embodiment of the present application provides a method for driving the array substrate above. The method includes in a touch phase: turning second switch devices corresponding to at least one electrode column in each electrode column group on, and first switch devices corresponding to the same column off; and providing, by the touch signal terminal groups, touch detection signals to electrode columns electrically connected to the turned-on second switch devices through the second signal lines. At the same time, the method includes: turning second switch devices corresponding to other electrode columns in each electrode column group off, and first switch devices corresponding to the same column on; and providing, by the common voltage lines, pulse signals to electrode columns electrically connected to the turned-on first switch devices through first signal lines. Where the touch detection signals and the pulse signals have a same waveform.

One embodiment of the present application provides a display panel including the array substrate according to the present application.

One embodiment of the present application provides a touch display device including the display panel according to the present application.

Compared with the prior art, the array substrate and the driving method, the display panel and the touch display device provided by the disclosure have at least the following beneficial effects.

In the array substrate, the display panel and the touch display device provided in the present application, M second switch control lines, second switch device groups and touch signal terminal groups are introduced in the non-display area of the array substrate. The number of touch signal terminals contained in each touch signal terminal group is the same as the number of first electrodes contained in the respective one electrode column. In particular, the same touch signal terminal group can provide touch detection signals to M adjacent electrode columns in the same electrode column group respectively, that is to say, the first electrodes in M electrode columns share one touch signal terminal group. Compared with the solution in the prior art in which the number of touch signal terminals and the number of touch electrodes are in the one-to-one manner, the method of sharing the touch signal terminal group in the present application greatly reduces the number of touch signal terminals, greatly reducing the number of traces drawn from the touch signal terminals. When the number of traces in the non-display area (i.e., frame area) of the array substrate is reduced, the width of the frame can be reduced to a certain extent, thus facilitating the realization of the narrow border design of the array substrate, the display panel and the touch display device.

In the driving method of the array substrate provided in the present application, in the touch phase, at least one electrode column in each electrode column group receives the touch detection signal, at least one electrode column receives the pulse signal, and the touch detection signal and the pulse signal have the same waveform, to facilitate reducing the influence of the electrode columns that do not receive touch detection signals on the signals of the first electrodes in the electrode column that is undergoing the touch detection during the touch phase, and thus facilitate enhancing the touch detection performance of the array substrate and improving the accuracy of touch detection.

BRIEF DESCRIPTION OF THE DRAWINGS

The drawings incorporated in the specification and constituting a part of the specification illustrate the embodiments of the disclosure, and together with the description thereof, are used to explain the principle of the disclosure.

DETAILED DESCRIPTION OF THE EMBODIMENTS

Figure 1:
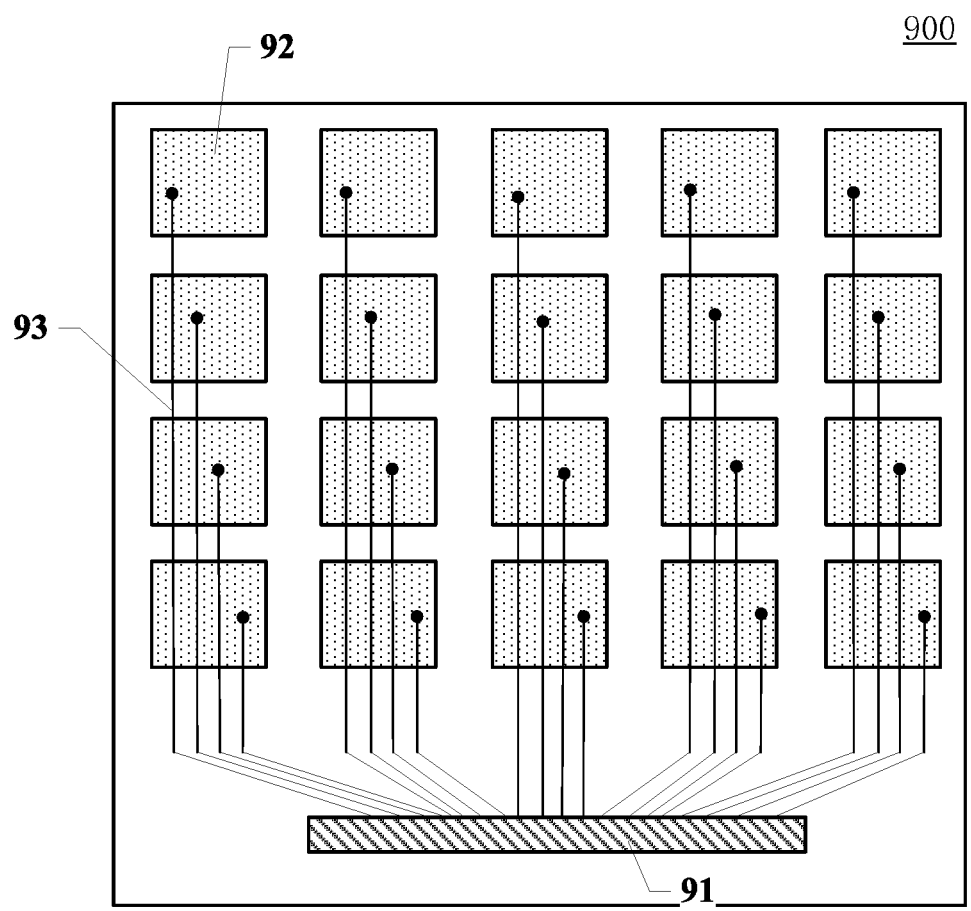
FIG. 1 is a structural schematic diagram of a display panel provided in related prior art.

Now various exemplary embodiments of the disclosure will be described in detail with reference to the accompanying drawings. It should be noted that, unless specifically stated otherwise, the relative arrangements of components and steps, numerical expressions and numerical values illustrated in these embodiments do not limit the scope of the disclosure.

The following description of at least one exemplary embodiment is actually only illustrative, and in no way serves as any limitation on the disclosure and its application or usage.

In all the examples shown and discussed here, any specific value should be interpreted as being merely exemplary and not as limitation. Therefore, other examples of the exemplary embodiments may have different values.

It should be noted that similar reference numerals and letters represent similar items in the following drawings. Thus, once an item is defined in one drawing, the item does not need to be further discussed in subsequent drawings.

FIG. 1 is a structural schematic diagram of a display panel 900 provided in the related prior art. The display panel 900 generally includes touch electrodes 92 arranged in an array and touch signal lines 93 electrically connected to the touch electrodes 92 in a one-to-one manner, and each touch electrode 92 is connected to an integrated circuit 91 through the corresponding touch signal line 93, so that the integrated circuit 91 can receive touch signals of any area of the display panel 900. However, there usually too many traces in the lower frame region of the display panel in such design, causing the larger width of the lower frame, and make it difficult for the display panel to have a narrow bezel.

Figure 2:
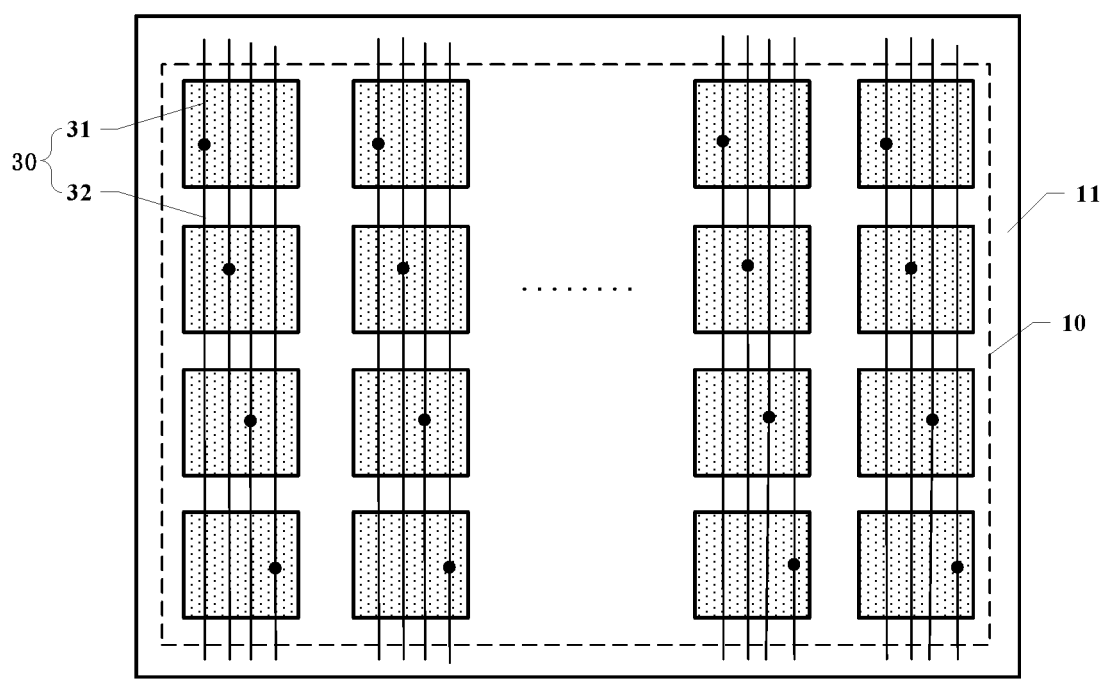
FIG. 2 is a structural schematic diagram of an array substrate according to an embodiment of the present application.
Figure 3:
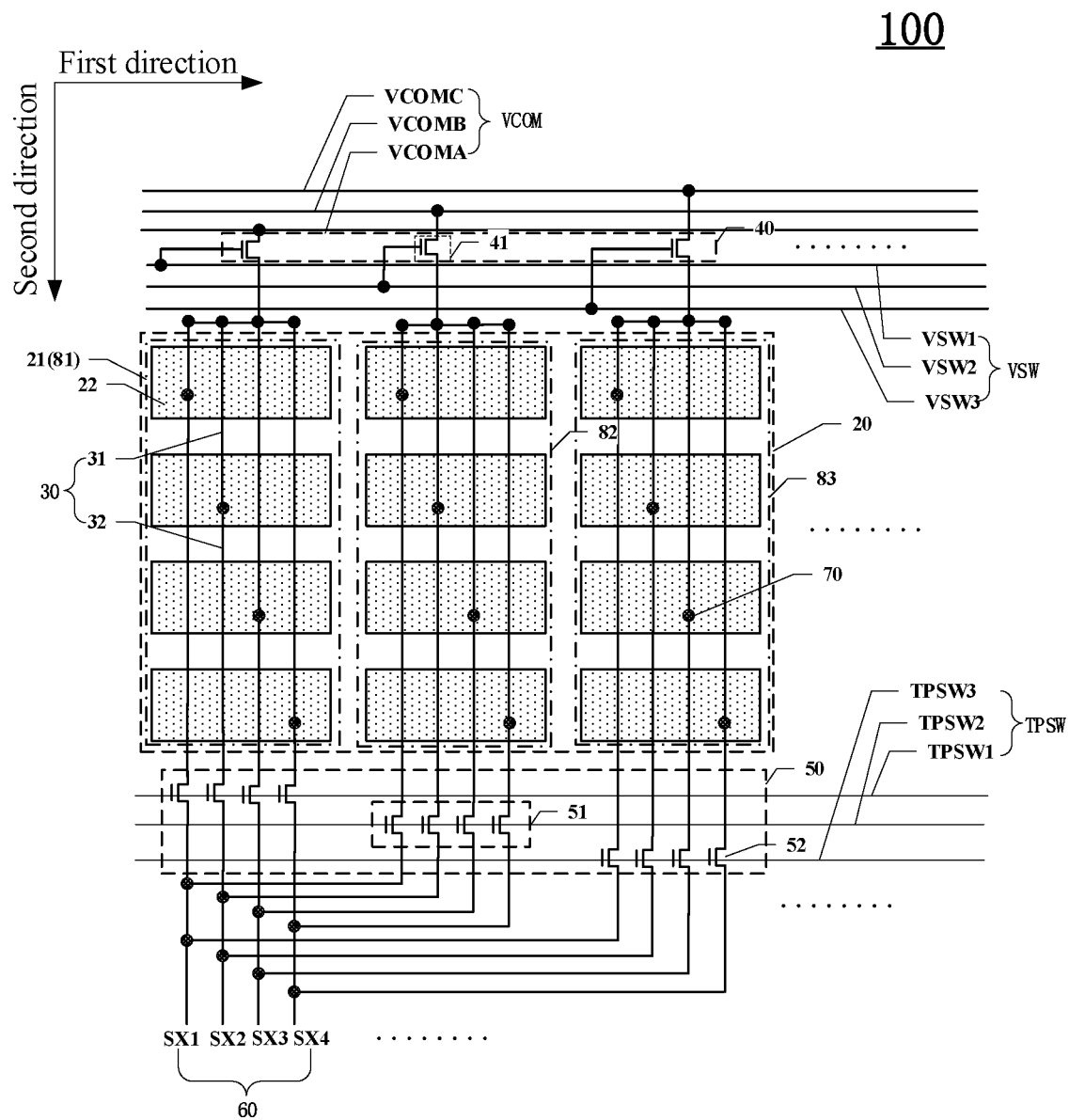
FIG. 3 is a schematic diagram illustrating the first electrodes involved connections in the array substrate according to an embodiment of the present application.

FIG. 2 is a structural schematic diagram of an array substrate according to an embodiment of the present application, and FIG. 3 is a schematic diagram illustrating the first electrodes involved connections in the array substrate according to an embodiment of the present application. Referring to FIG. 2 and FIG. 3, the present application provides an array substrate 100 including: a display area 10 and a non-display area 11 surrounding the display area 10;

electrode column groups 20 arranged in the first direction, where each electrode column group 20 includes M adjacent electrode columns 21 extending in the second direction and arranged in the first direction, and each electrode column 21 includes N first electrodes 22 located in the display area 10, where M≥2, N≥2, and the first direction intersects with the second direction, FIG. 3 takes M=3 and N=4 as an example for illustration, and it should be noted that the number of electrode columns 21 contained in each electrode column group 20 may be more, and the number of the first electrodes 22 contained in each electrode column 21 may also be more, which are not specifically limited in the present application;

touch signal lines 30, each of which includes a first signal line 31 and a second signal line 32 electrically connected to each other, where the first signal line 31 and the second signal line 32 of the same touch signal line 30 are electrically connected to the same first electrode 22;

M common voltage lines VCOM, M first switch control lines VSW and first switch device groups 40 located in the non-display area 11, where the first switch device group 40 includes M first switch devices 41; in each electrode column group 20: the first electrodes 22 in the same electrode column 21 are connected to a first terminal of the same first switch device 41 via the respective first signal lines 31; the second terminals of all the first switch devices 41 in the same first switch device group 40 are respectively connected to different common voltage lines VCOM, and the gates of all the first switch devices 41 in the same first switch device group 40 are connected to different first switch control lines VSW;

M second switch control lines TPSW, second switch device groups 50 and touch signal terminal groups 60 located in the non-display area 11; where each second switch device group 50 includes M sub-switch device groups 51, each of which includes N second switch devices 52, and each touch signal terminal group 60 includes N touch signal terminals SX; in each electrode column group 20: the second signal lines 32 corresponding to the first electrodes 22 are electrically connected to the first terminals of second switch devices 52 in a one-to-one manner; in the same second switch device group 50, the gates of the second switches in the same sub-switch device group 51 are connected to the same second switch control line TPSW, and the gates of the second switches in different sub-switch device groups 51 are respectively connected to different second switch control lines TPSW; and N touch signal terminals in the same touch signal terminal group 60 are respectively electrically connected to the second terminals of N second switch devices in the any sub-switch device group 51 in the same second switch device group in a one-to-one manner.

In the existing design, since each touch electrode is connected to the integrated circuit through the corresponding touch signal line, it is necessary to design the same number of touch signal terminals as that of touch electrodes on the integrated circuit, but such scheme causes too many traces in the lower frame region of the display panel, to cause the larger width of the lower frame of the display panel, and make it difficult for the display panel to have a narrow bezel.

In the display panel provided by the embodiment of the present application, taking M=3 and N=4 as an example, electrode column groups 20 arranged in the first direction are provided in the display area 10, each electrode column group 20 includes three adjacent electrode columns 21, and each electrode column 21 includes four first electrodes 22; three second switch control lines (TPSW1, TPSW2 and TPSW3 respectively) are provided in the non-display area 11, each sub-switch device group 51 includes four second switch devices 52, and each touch signal terminal group 60 includes four touch signal terminals; the gates of the second switches in the same sub-switch device group 51 are connected to the same second switch control line, and the gates of the second switches in different sub-switch device groups 51 are respectively connected to the second switch control lines TPSW1, TPSW2 and TPSW3. In particular, four touch signal terminals in the same touch signal terminal group 60 are respectively electrically connected to the second terminals of four second switch devices 52 in any sub-switch device group 51 in the same second switch device group 50 in one-to-one manner, and the second switch device group 50 includes three sub-switch device groups 51. Thus, equivalently one control signal terminal group 60 can provide touch detection signals respectively to three electrode columns 21 electrically connected to the second switch devices 52 in the three sub-switch device groups 51, that is to say, the first electrodes 22 in three electrode columns 21 share one touch signal terminal group 60. Compared with the solution in the prior art in which the number of touch signal terminals and the number of touch electrodes are in the one-to-one manner, the method of sharing the touch signal terminal group 60 in the present application greatly reduces the number of touch signal terminals. In the embodiment shown in FIG. 3, the number of touch signal terminals is only ⅓ of the number of touch signal terminals in the prior art, greatly reducing the number of traces drawn from the touch signal terminals. When the number of traces in the non-display area (i.e., frame area) of the array substrate 100 is reduced, the width of the frame can be reduced to a certain extent, thus facilitating the realization of the narrow bezel design of the array substrate 100.

The present application further introduces the common voltage lines VCOM, the first switch control lines VSW and the first switch device groups 40 in the non-display area 11. In the touch phase, the touch signal terminal group 60 transmits touch detection signals to at least one electrode column 21 in each electrode column group 20, the common voltage line VCOM transmits pulse signals to at least one electrode column 21 in each electrode group, and the touch detection signals and the pulse signals have the same waveform, to facilitate reducing the influence of the electrode columns 21 that do not receive touch detection signals on the signals of the first electrodes 22 in the electrode column 21 that is undergoing the touch detection during the touch phase T2, and thus facilitate enhancing the touch detection performance of the array substrate 100 and improving the accuracy of touch detection.

It should be noted that the embodiment shown in FIG. 3 only shows the connection relationship of one electrode column group 20. In fact, the array substrate 100 may be provided with repeatedly arranged electrode column groups 20 as shown in FIG. 3, and the connection relationships of other electrode column groups 20 on the array substrate 100 may be implemented with reference to FIG. 3, which will not be shown one by one. It should also be noted that, in order to clearly reflect the connection relationship among the first electrodes 22, the first switch devices 41 and the second switch devices 52 on the array substrate 100, these components are enlarged in the drawings of the present application, and thus do not represent the actual sizes.

Figure 4:
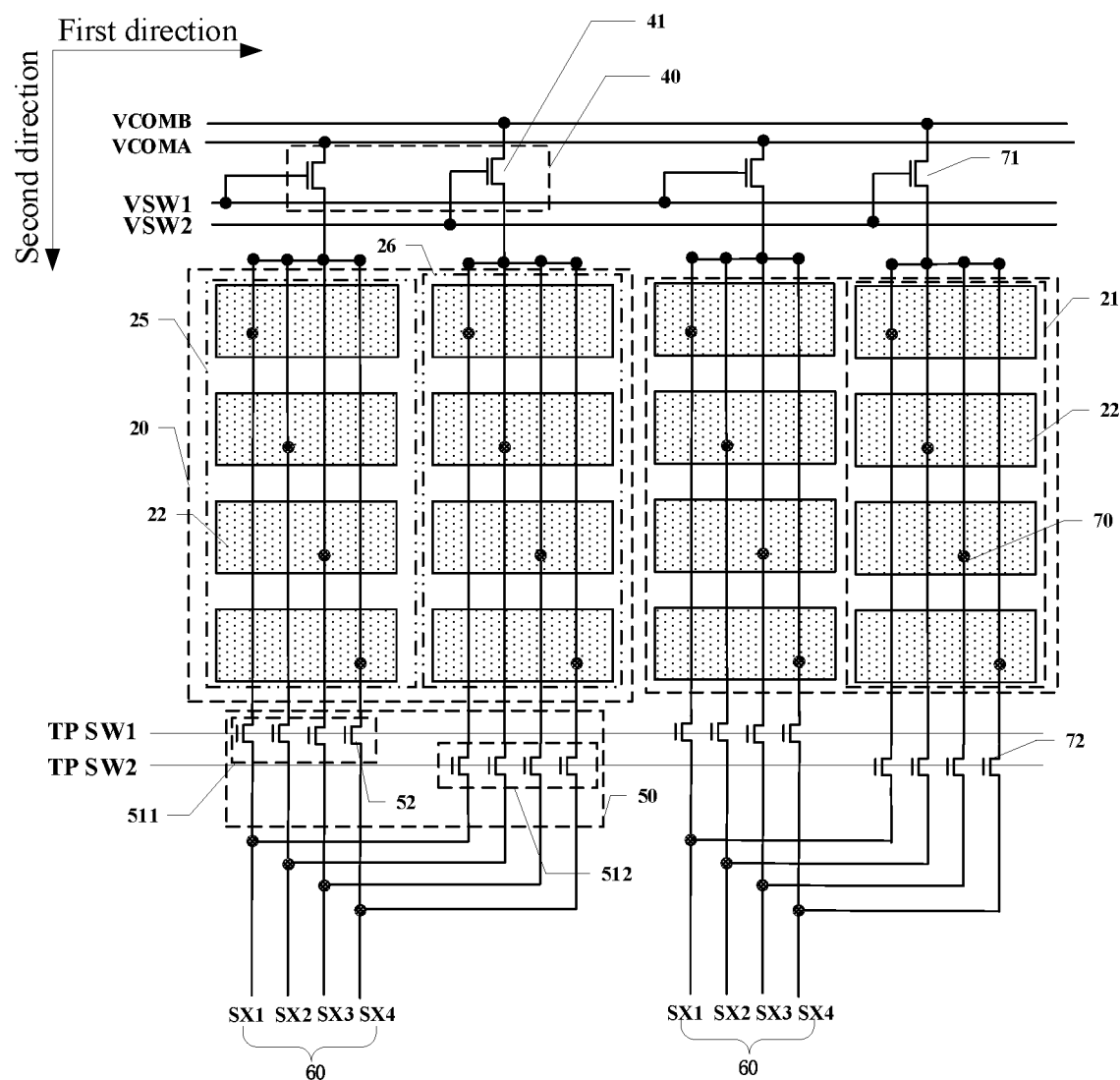
FIG. 4 is another schematic diagram illustrating the first electrodes involved connections in the array substrate according to an embodiment of the present application.

In one embodiment, FIG. 4 is another schematic diagram illustrating the first electrodes 22 involved connections in the array substrate 100 according to an embodiment of the present application. This embodiment shows the case of M=2 as an example. Referring to FIG. 4, the common voltage lines VCOM include first common voltage lines VCOMA and second common voltage lines VCOMB, the first switch control lines VSW include first I-type switch control lines VSW1 and first II-type switch control lines VSW2; the second switch control lines TPSW include second I-type switch control lines TPSW1 and second II-type switch control lines TPSW2; each second switch device group 50 includes a first sub-switch device group 511 and a second sub-switch device group 512; and the electrode column group 20 includes adjacent odd-numbered electrode columns 25 and even-numbered electrode columns 26.

In the same first switch device group 40, the gate of the first switch device 41 electrically connected to the first electrode 22 in an odd-numbered electrode column 25 is connected to a first I-type switch control line VSW1, and the second terminal is connected to a first common voltage line VCOMA; and the gate of each first switch device 41 electrically connected to the first electrode 22 in an even-numbered electrode column 26 is connected to the first II-type switch control line VSW2, and the second terminal is connected to a second common voltage line VCOMB.

In the same second switch device group 50, the first terminal of each second switch device 52 in a first sub-switch device group 511 is electrically connected to each first electrode 22 in an odd-numbered electrode column 25, and the first terminal of each second switch device 52 in a second sub-switch device group 512 is electrically connected to each first electrode 22 in an even-numbered electrode column 26; the gate of each second switch device 52 in the first sub-switch device group 511 is connected to a second I-type switch control line TPSW1, and the gate of each second switch device 52 in the second sub-switch device group 512 is connected to a second II-type switch control line TPSW2; each touch signal terminal in the same touch signal terminal group 60 is simultaneously electrically connected to the second terminal of a second switch device 52 in the first sub-switch device group 511 and the second terminal of a second switch device 52 in the second sub-switch device group 512.

It should be noted that the embodiment shown in FIG. 4 only shows the connection relationship of two electrode column groups 20. In fact, the array substrate 100 may be provided with repeatedly arranged electrode column groups 20 as shown in FIG. 4, and the connection relationships of other electrode column groups 20 on the array substrate 100 may be implemented with reference to FIG. 4, which will not be shown one by one.

In one embodiment, with continued reference to FIG. 4, when M=2, each electrode column group 20 includes two electrode columns, which are an odd-numbered electrode column 25 and an even-numbered electrode column 26 respectively. The first I-type switch control line VSW1 is electrically connected to the gate of the first switch device 41 electrically connected to the odd-numbered electrode column 25, and is used to make the first switch device 41 connected thereto conduct or cut-off; and the first II-type switch control line VSW2 is electrically connected to the gate of the first switch device 41 electrically connected to the even-numbered electrode column 26, and is used to control the first switch device 41 connected thereto conduct or cut-off.

The first common voltage line VCOMA is used to send signals to the odd-numbered electrode columns 25, and the second common voltage line VCOMB is used to send signals to the even-numbered electrode columns 26. The second I-type switch control line TPSW1 is electrically connected to the gate of the second switch device 52 electrically connected to the odd-numbered electrode column 25, and is used to make the second switch device 52 connected thereto conduct or cut-off; and the second II-type switch control line TPSW2 is electrically connected to the gate of the second switch device 52 electrically connected to the even-numbered electrode column 26, and is used to make the second switch device 52 connected thereto conduct or cut-off. One touch signal terminal group 60 is used to provide touch detection signals to the odd-numbered electrode column 25 and even-numbered electrode column 26 in the same electrode column group 20 respectively. That is to say, two electrode columns 21 can share one touch signal terminal group 60. Compared with the solution in the prior art in which each electrode column 21 corresponds to one touch signal terminal group 60, the solution of sharing the touch signal terminal group 60 of the present application can reduce the number of touch signal terminals by half, so that the traces connected to the touch signal terminals can also be reduced by half, and the compressible space is provided for the frame region of the array substrate 100, thus facilitating the realization of the narrow border design.

Figure 5:
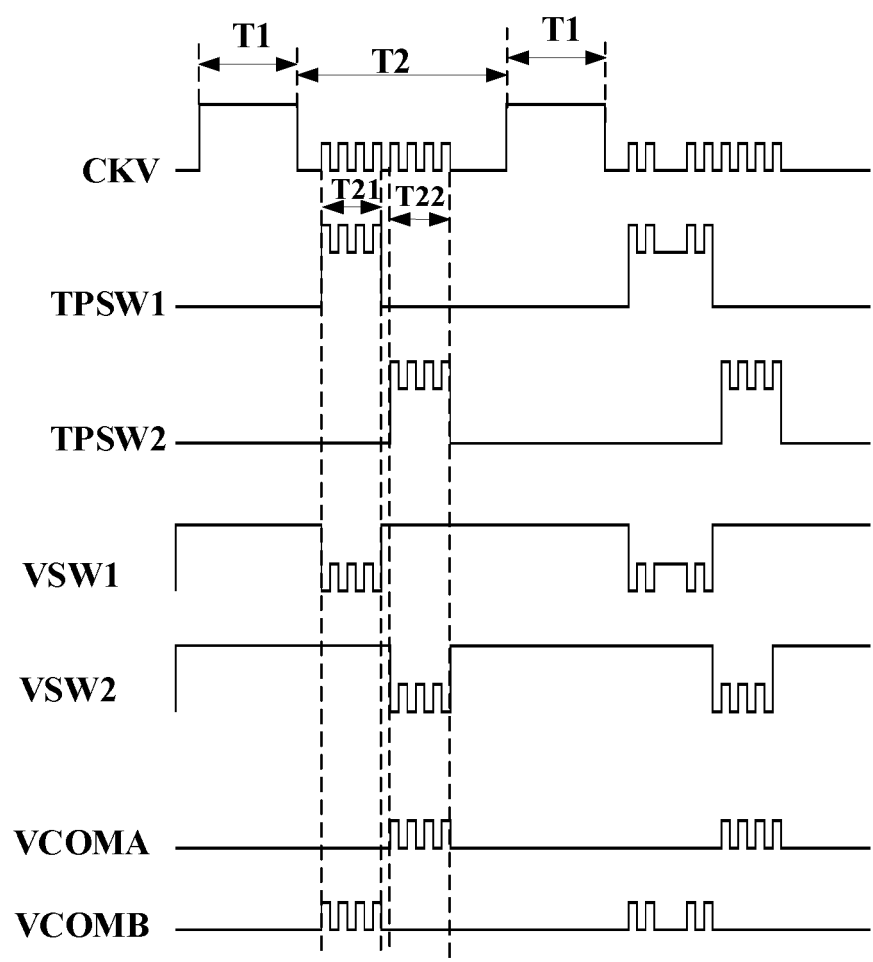
FIG. 5 is a timing chart for driving the array substrate according to an embodiment of the present application.

The driving method of the array substrate 100 shown in FIG. 4 will be illustrated below with reference to FIG. 5, where FIG. 5 is a timing chart for driving the array substrate 100 according to an embodiment of the present application.

In the first touch stage T21, the second I-type switch control line TPSW1 provides a high-level signal, and the first electrodes 22 of all odd-numbered electrode columns 25 receive the touch detection signals sent by the touch signal terminal group 60; while the second II-type switch control line TPSW2 provides a low-level signal, and the first electrodes 22 of all even-numbered electrode columns 26 cannot receive the touch detection signals. Meanwhile, the first I-type switch control line VSW1 provides a low-level signal, the first electrodes 22 of all odd-numbered electrode columns 25 are independent of each other, the first II-type switch control line VSW2 provides a high-level signal, and the second common voltage line VCOMB provides pulse signals to all even-numbered electrode columns 26.

In the second touch stage T22, the second II-type switch control line TPSW2 provides a high-level signal, and the first electrodes 22 of all even-numbered electrode columns 26 receive the touch detection signals sent by the touch signal terminal group 60; while the second I-type switch control line TPSW1 provides a low-level signal, and the first electrodes 22 of all odd-numbered electrode columns 25 cannot receive the touch detection signals. At this time, the first II-type switch control line VSW2 provides a low-level signal, the first electrodes 22 of all even-numbered electrode columns 26 are independent of each other, the first I-type switch control line VSW1 provides a high-level signal, and the first common voltage line VCOMA provides pulse signals to all odd-numbered electrode columns 25.

In the prior art, when a touch detection signal is sent to a certain electrode column, there is the capacitive coupling effect between the first electrode in the electrode column receiving the touch function detection signal and the first electrode in the adjacent electrode column. Therefore, when a touch occurs, the signal read back by the first electrode column to the integrated circuit may be distorted, reducing the accuracy of touch detection. While, in the present application, in the touch phase T2, the pulse signals sent to the odd-numbered electrode column 25 and the even-numbered electrode column 26 in the same electrode column group 20 have the same waveform as the touch detection signal, which can avoid the capacitive coupling effect between the first electrodes 22 in two adjacent electrode columns 21, to facilitate reducing the influence of the electrode columns 21 that do not receive touch detection signals on the signals of the first electrodes 22 in the electrode column 21 that is undergoing the touch detection during the touch phase T2, and thus facilitate enhancing the touch detection performance of the array substrate 100 and improving the accuracy of touch detection.

Generally, the array substrate further includes pixel rows, each pixel row includes sub-pixels, and each pixel row corresponds to a scan line. In the display stage, the scan line scans the pixel rows in sequence to realize the display function. The CKV in the timing chart shown in FIG. 5 refers to the clock signal controlling the scan line to scan the pixel rows. In the display phase T1, the CKV signal is at a high level and controls the scan line to scan the pixel rows. In the touch phase, the CKV signal is at a low level, and the waveform of the low-level pulse signal is consistent with the waveform of the touch detection signal, which also facilitates avoiding the signal on the scan line from affecting the first electrodes in the touch phase, and thus also facilitates enhancing the touch detection performance of the array substrate and improving the accuracy of touch detection.

It should be noted that the same waveform mentioned in the present application means that the pulse signal and the touch detection signal have the same amplitude and the same phase. In addition, the timing chart shown in FIG. 5 only shows the process of performing the touch detection on the odd-numbered electrode column 25 in the first touch stage T21 and then performing the touch detection on the even-numbered electrode column 26 in the second touch stage T22. In some other embodiments of the present application, it is also possible to perform the touch detection on the even-numbered electrode column 26 in the first touch stage T21 and then perform the touch detection on the odd-numbered electrode column 25 in the second touch stage T22, which is not specifically limited in the present application.

In one embodiment, with continued reference to FIG. 4, in the first sub-switch device group 511 and the second sub-switch device group 512, all the second switch devices 52 are arranged in sequence in the first direction; in an odd-numbered electrode column 25, the first electrode 22 in the $n^{th}$ row is electrically connected to the $n^{th}$ second switch device 52 in the first sub-switch device group 511 via the second signal line 32; in an even-numbered electrode column 26, the first electrode 22 in the $n^{th}$ row is electrically connected to the $n^{th}$ second switch device 52 in the second sub-switch device group 512 via the second signal line 32; where $1 \leq n \leq N$.

In one embodiment, referring to FIG. 4, in this embodiment, the first electrodes 22 in the $n^{th}$ row in the odd-numbered electrode column 25 and the even-numbered electrode column 26 refer to the $n^{th}$ first electrodes 22 from the top to bottom in the second direction in the view shown in FIG. 4; and the $n^{th}$ second switch devices 52 in the first sub-switch device group 511 and the second sub-switch device group 512 refer to the $n^{th}$ electrodes from left to right in the first direction. In the present application, the $n^{th}$ first electrode 22 in each electrode column 21 is electrically connected to the $n^{th}$ second switch device 52 in the sub-switch device group 51 in a one-to-one manner, and the electrical connection relationship between the first electrodes 22 in each electrode column 21 and the second switch devices 52 is set according to this rule, so that the connection sequence of the first electrodes 22 in each electrode column 21 and the second switch devices 52 in each switch device group keeps consistent, to facilitate reducing the wiring complexity of the array substrate 100 and improving the production efficiency of the array substrate 100.

It should be noted that the case where the $n^{th}$ first electrode in the electrode column 21 is the $n^{th}$ first electrode 22 from top to bottom in the second direction and the $n^{th}$ second switch device 52 in the sub-switch device group 51 is the $n^{th}$ second switch device 52 from left to right in the first direction is taken as an example for illustration in the present application. In some other embodiments of the present application, the $n^{th}$ first electrode in the electrode column 21 may also be the $n^{th}$ first electrode 22 from bottom to top in the second direction, and the $n^{th}$ second switch device 52 in the sub-switch device group 51 may also be the $n^{th}$ second switch device 52 from right to left in the first direction, which are not specifically limited in the present application.

Figure 6:
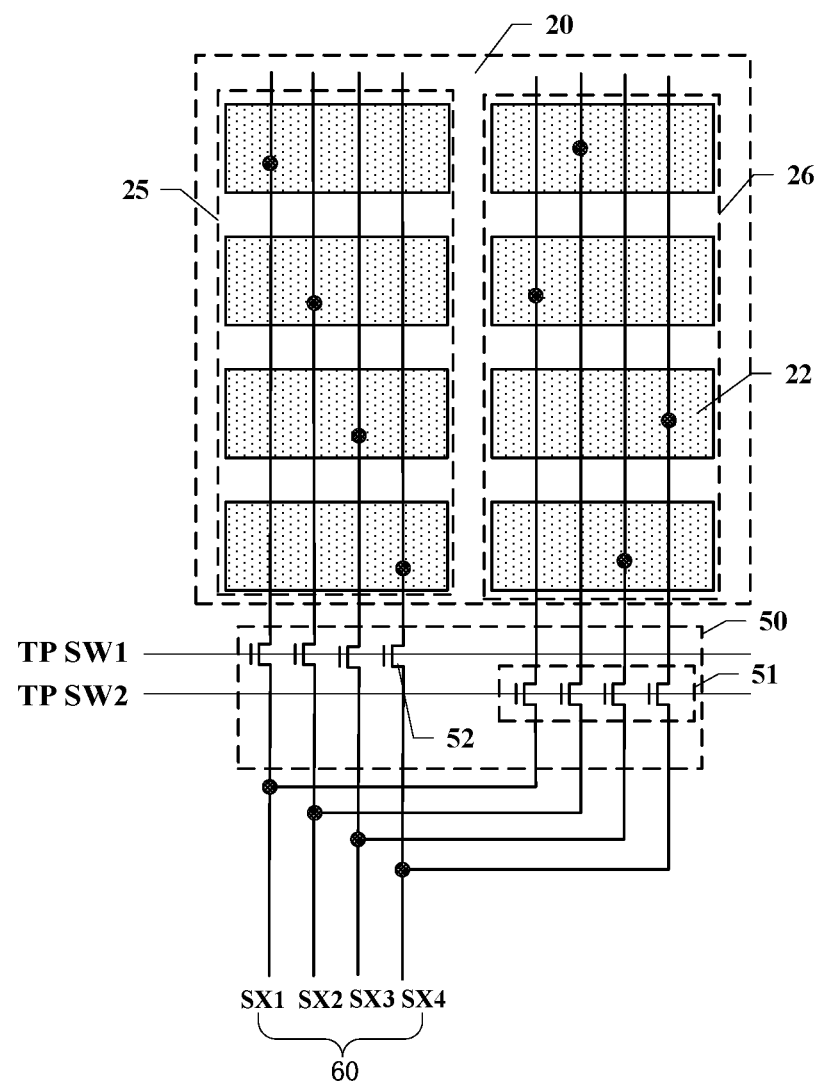
FIG. 6 is a schematic diagram illustrating a connection relationship between the same touch signal terminal group and electrode columns according to an embodiment of the present application.

In one embodiment, FIG. 6 is a diagram of a connection relationship between the same touch signal terminal group 60 and electrode columns 21 in an embodiment of the present application. In the same touch signal terminal group 60, two first electrodes 22 electrically connected to the same touch signal terminal are located in different rows.

In one embodiment, with continued reference to FIG. 6, in this embodiment, the touch signal terminal SX1 is electrically connected to the $1^{st}$ first electrode 22 in the odd-numbered electrode column 25 and the $2^{nd}$ first electrode 22 in the even-numbered electrode column 26; the touch signal terminal SX2 is electrically connected to the $2^{nd}$ first electrode 22 in the odd-numbered electrode column 25 and the Pt first electrode 22 in the even-numbered electrode column 26; the touch signal terminal SX3 is electrically connected to the 3rd first electrode 22 in the odd-numbered electrode column 25 and the $4^{th}$ first electrode 22 in the even-numbered electrode column 26, and the touch signal terminal SX4 is electrically connected to the $4^{th}$ first electrode 22 in the odd-numbered electrode column 25 and the $3^{rd}$ first electrode 22 in the even-numbered electrode column 26. In this way, two first electrodes 22 connected to the same touch signal terminal are located in different rows. Such design facilitates avoiding the crosstalk phenomenon formed between two first electrodes 22 connected to the same touch signal terminal when the two first electrodes 22 are arranged in the same row, and thus further improving the touch detection accuracy of the array substrate 100.

Figure 7:
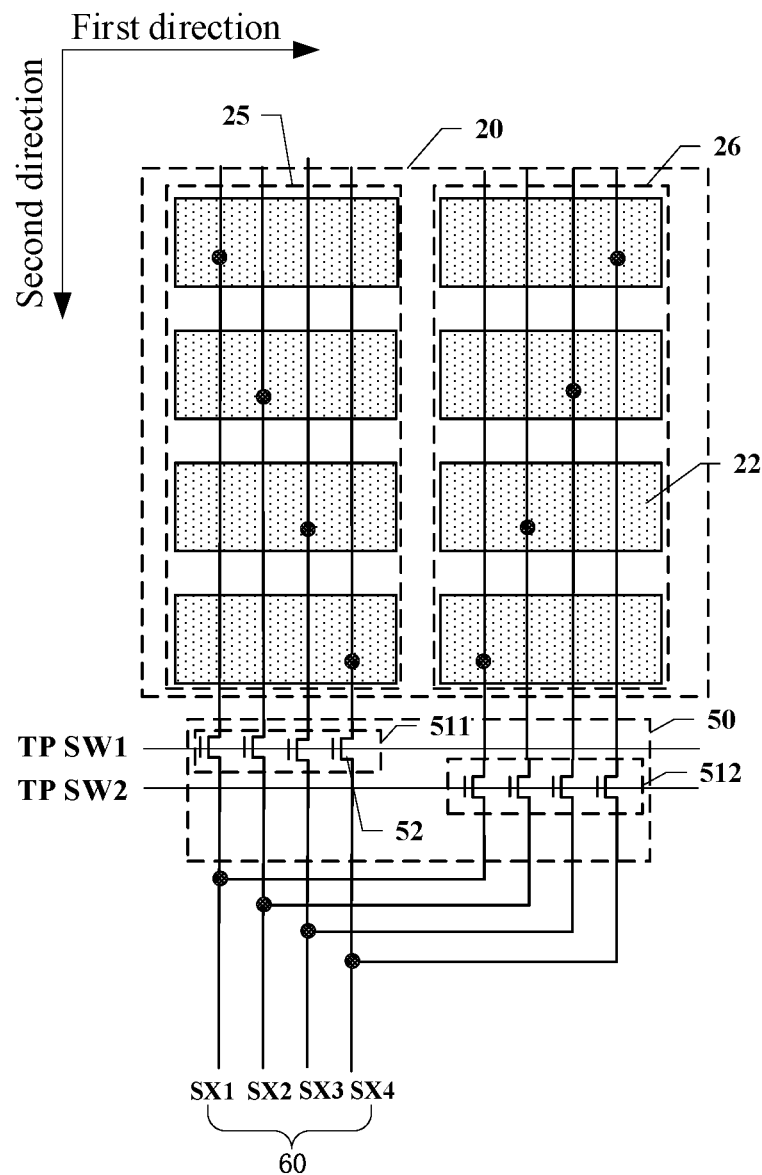
FIG. 7 is a schematic diagram of another connection relationship between the same touch signal terminal group and electrode columns according to an embodiment of the present application.

In one embodiment, FIG. 7 is a diagram of another connection relationship between the same touch signal terminal group 60 and electrode columns in an embodiment of the present application, where all the touch signal terminals in the same touch signal terminal group 60 is arranged in sequence in the first direction.

The $m^{th}$ touch signal terminal is electrically connected to the $m^{th}$ first electrode in the odd-numbered electrode column 25, and is electrically connected to the $(N-m+1)^{th}$ first electrode in the even-numbered electrode column 26, where $1 \leq m \leq N$.

In one embodiment, with continued reference to FIG. 7, in this embodiment, the touch signal terminal SX1 is electrically connected to the Pt first electrode 22 in the odd-numbered electrode column 25 and the $4^{th}$ first electrode 22 in the even-numbered electrode column 26; the touch signal terminal SX2 is electrically connected to the $2^{nd}$ first electrode 22 in the odd-numbered electrode column 25 and the $3^{rd}$ first electrode 22 in the even-numbered electrode column 26; the touch signal terminal SX3 is electrically connected to the $3^{rd}$ first electrode 22 in the odd-numbered electrode column 25 and the $2^{nd}$ first electrode 22 in the even-numbered electrode column 26; and the touch signal terminal SX4 is electrically connected to the $4^{th}$ first electrode 22 in the odd-numbered electrode column 25 and the Pt first electrode 22 in the even-numbered electrode column 26. Such connection mode facilitates increasing the distance between at least a part of the first electrodes 22 connected to the same touch signal terminal. For example, among the first electrodes 22 connected to the touch signal terminal SX1, one is located in the first row and the other is located in the last row, to facilitate avoiding the crosstalk phenomenon formed between the two electrodes to the greatest extent, and be more beneficial to improve the touch detection accuracy of the array substrate 100. Of course, this embodiment only takes the same electrode column 21 including four first electrodes 22 as an example for illustration. In some other embodiments of the present application, the same electrode column 21 may also include more first electrodes 22, where the connection relationship between the first electrodes 22 and the touch signal terminal can refer to the aforementioned rule, which is not specifically limited in the present application.

Figure 8:
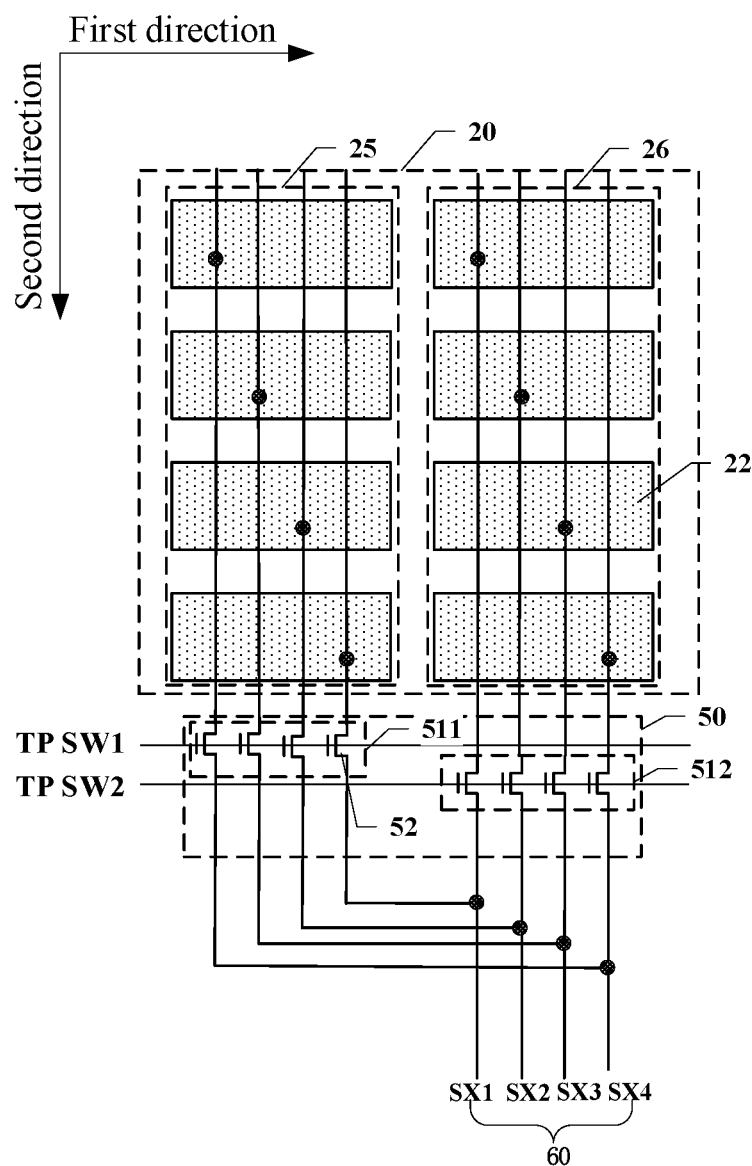
FIG. 8 is a schematic diagram of another connection relationship between the same touch signal terminal group and electrode columns according to an embodiment of the present application.

In one embodiment, FIG. 8 is a diagram of another connection relationship between the same touch signal terminal group 60 and electrode columns 21 in an embodiment of the present application, where all the touch signal terminals in the same touch signal terminal group 60 is arranged in sequence in the first direction.

The $m^{th}$ touch signal terminal is electrically connected to the second terminal of the $m^{th}$ second switch device 52 in the second sub-switch device group 512, and is electrically connected to the second terminal of the (N−m+1)$^{th}$ second switch device 52 in the first sub-switch device group 511, where 1≤m≤N.

In one embodiment, with continued reference to FIG. 8, in this embodiment, the touch signal terminal SX1 is electrically connected to the 1$^{st}$ first electrode 22 in the even-numbered electrode column 26 and the 4$^{th}$ first electrode 22 in the odd-numbered electrode column 25; the touch signal terminal SX2 is electrically connected to the 2$^{nd}$ first electrode 22 in the even-numbered electrode column 26 and the 3$^{rd}$ first electrode 22 in the odd-numbered electrode column 25; the touch signal terminal SX3 is electrically connected to the 3$^{rd}$ first electrode 22 in the even-numbered electrode column 26 and the 2$^{nd}$ first electrode 22 in the odd-numbered electrode column 25; and the touch signal terminal SX4 is electrically connected to the 4$^{th}$ first electrode 22 in the even-numbered electrode column 26 and the 1$^{st}$ first electrode 22 in the odd-numbered electrode column 25. Such connection mode facilitates increasing the distance between at least a part of the first electrodes 22 connected to the same touch signal terminal. For example, among the first electrodes 22 connected to the touch signal terminal SX1, one is located in the first row and the other is located in the last row, which also facilitates avoiding the crosstalk phenomenon formed between the two electrodes to the greatest extent, and is more beneficial to improve the touch detection accuracy of the array substrate 100. Of course, this embodiment only takes the same electrode column 21 including four first electrodes 22 as an example for illustration. In some other embodiments of the present application, the same electrode column 21 may also include more first electrodes 22, where the connection relationship between the first electrodes 22 and the touch signal terminal can refer to the aforementioned rule, which is not specifically limited in the present application.

In one embodiment, referring to FIGS. 2 to 4, in the array substrate 100 provided by the embodiment of the present application, the common voltage lines VCOM, the first switch control lines VSW and the first switch device groups 40 are located in the non-display area 11 at the first side of the display area 10; the second switch control lines TPSW, the second switch device groups 50 and the touch signal terminal groups 60 are located in the non-display area 11 at the second side of the display area 10; and the first side is arranged opposite to the second side in the second direction.

In one embodiment, in the present application, the common voltage lines VCOM, the first switch control lines VSW and the first switch device groups 40 are arranged in the non-display area 11 at the first side of the display area 10; and the second switch control lines TPSW, the second switch device groups 50 and the touch signal terminal groups 60 are arranged in the non-display area 11 at the second side of the display area 10. The space of the non-display area 11 on the array substrate 100 is utilized reasonably, to avoid concentrating these components in the non-display area 11 on the same side of the array substrate 100 to cause the too large width of the non-display area 11 on that side, i.e., the too large frame width. Therefore, the above arrangement is beneficial to further realize the narrow bezel design for the array substrate 100.

In one embodiment, referring to FIGS. 3 and 4, both the first signal line 31 and the second signal line 32 extend in the second direction, and in touch signal line 30 corresponding to the same first electrode 22, the first signal line 31 and the second signal line 32 are electrically connected to the first electrode 22 through the same connection via hole 70.

In one embodiment, in the present application, both the first signal line 31 and the second signal line 32 are arranged to extend in the second direction, so that the first signal line 31 and the second signal line 32 corresponding to the same first electrode 22 can be located on the same straight line. In the actual production process, the production of the first signal line 31 and the second signal line 32 can be completed at the same time by using the same manufacturing procedure, to facilitate simplifying the production process of the array substrate 100. Moreover, when the first signal line 31 and the second signal line 32 are electrically connected through the same connection via hole 70, the number of connection via holes 70 between the touch signal line 30 and the corresponding first electrode 22 is reduced to the minimum. The usage of one connection via hole can realize the electrical connections of the first electrode 22 with the first signal line 31 and the second signal line 32 at the same time, thus facilitating the further simplification of the production process of the array substrate 100 and improving the production efficiency of the array substrate 100.

In one embodiment, referring to FIG. 4, each first switch device 41 includes a first transistor 71, and each second switch device 52 includes a second transistor 72. In the present application, the first transistor 71 and the second transistor 72 may be simultaneously implemented as PMOS transistors, or the first transistor 71 and the second transistor 72 may be simultaneously implemented as NMOS transistors, or the first transistor 71 is a PMOS transistor and the second transistor 72 is an NMOS transistor; or the first transistor 71 is an NMOS transistor and the second transistor 72 is a PMOS transistor. Here, the PMOS transistor is turned on when the gate is at a low level and turned off when the gate is at a high level; and the NMOS transistor is turned on when the gate is at a high level and turned off when the gate is at a low level. In the actual production process, according to the actual demand, the first switch device 41 may be a PMOS transistor or an NMOS transistor, and the second switch device 52 may be a PMOS transistor or an NMOS transistor, which are not specifically limited in the present application.

Based on the same inventive concept, the present application further provides a method of driving the array substrate 100, which is used to drive the array substrate 100 provided in any above embodiment of the present application. The method includes the driving method during the touch phase T2, where:

referring to FIGS. 3 and 4, in the touch phase, the second switch devices 52 corresponding to at least one electrode column 21 in each electrode column group 20 are turned on and the first switch devices 41 corresponding to the same are turned off, and the touch signal terminal groups 60 provide touch detection signals to the electrode columns 21 electrically connected to the turned-on second switch devices 52 through the second signal lines 32; and at the same time, the second switch devices 52 corresponding to other electrode columns 21 in each electrode column group 20 are turned off and the first switch devices 41 corresponding to the same are turned on, and the common voltage lines VCOM provide pulse signals to the electrode columns 21 electrically connected to the turned-on first switch devices 41 through the first signal lines 31; where the touch detection signals and the pulse signals have the same waveform.

Figure 9:
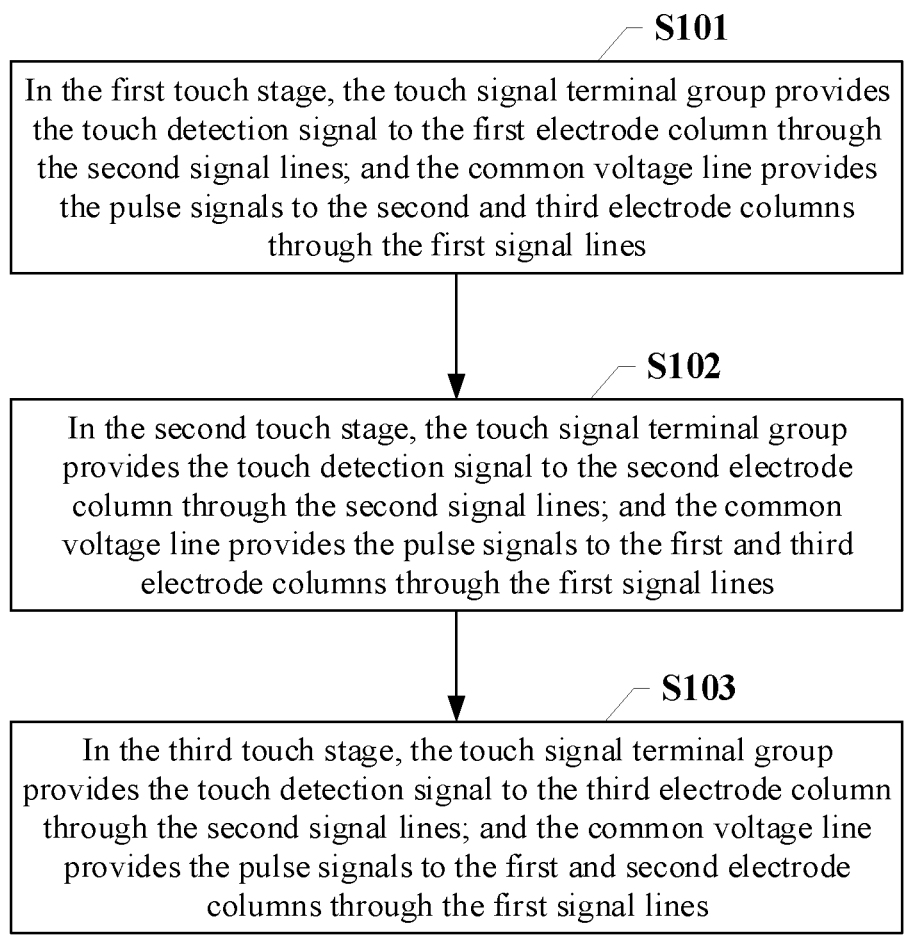
FIG. 9 is a flowchart of a method of driving an array substrate according to an embodiment of the present application.
Figure 10:
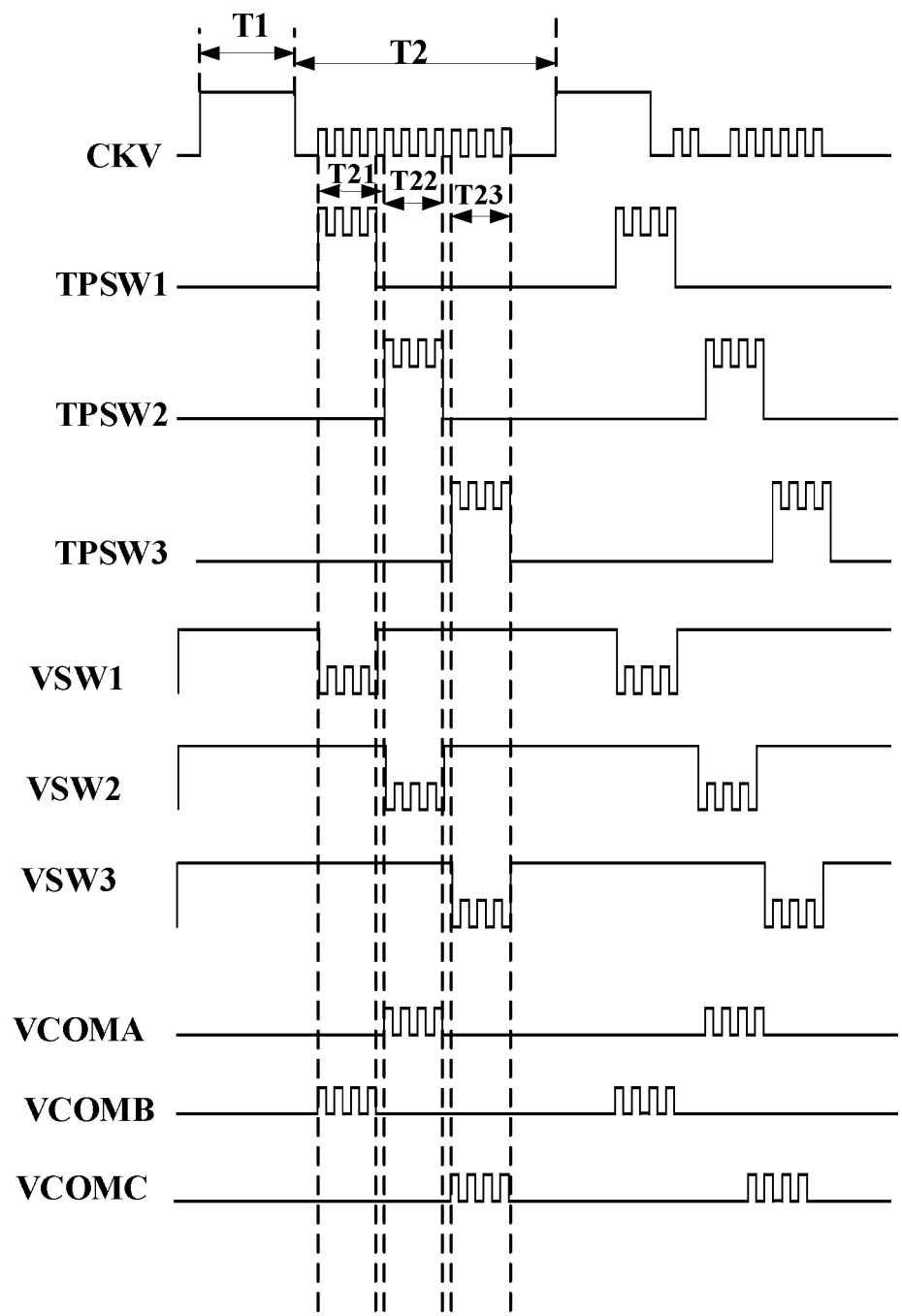
FIG. 10 is a timing chart corresponding to the method shown in FIG. 9.

FIG. 9 is a flowchart of a method of driving the array substrate 100 according to an embodiment of the present application, and FIG. 10 is a timing chart corresponding to the driving method shown in FIG. 9; and the flowchart shown in FIG. 9 illustrates the case where one electrode column group 20 includes three electrode columns 21. Referring to FIG. 3, assuming that each electrode column group 20 includes a first electrode column 81, a second electrode column 82 and a third electrode column 83, then the method of driving the array substrate 100 may be implemented as follows.

In the first touch stage T21, the first switch control line VSW1 provides a low-level control signal to the first switch device 41 connected thereto, and the second switch control line TPSW1 sends a high-level control signal to the second switch devices 52 connected thereto, so that the second switch devices 52 are turned on and the first switch device 41 is turned off corresponding to the first electrode column 81 in each electrode column group 20, and the touch signal terminal group 60 provides a touch detection signal to the first electrode column 81 through the second signal line 32; and at the same time, the first switch control line VSW2 provides a low-level control signal to the first switch device 41 connected thereto, the first switch control line VSW3 provides a low-level control signal to the first switch device 41 connected thereto, the second switch control line TPSW2 provides a high-level control signal to the second switch devices 52 connected thereto, and the second switch control line TPSW3 sends a high-level control signal to the second switch devices 52 connected thereto, so that the second switch devices 52 corresponding to the second electrode column 82 and the third electrode column 83 in each electrode column group 20 respectively are turned off and the first switch devices 41 corresponding to the same electrode columns are turned on, and the common voltage lines VCOMB and VCOMC provide pulse signals to the second electrode column 82 and the third electrode column 83 through the first signal lines 31.

In the second touch stage T22, the first switch control line VSW2 provides a low-level control signal to the first switch device 41 connected thereto, and the second switch control line TPSW2 sends a high-level control signal to the second switch devices 52 connected thereto, so that the second switch devices 52 corresponding to the second electrode column 82 in each electrode column group 20 are turned on and the first switch device 41 corresponding to the same electrode column is turned off, and the touch signal terminal groups 60 provide a touch detection signal to the second electrode column 82 through the second signal line 32; and at the same time, the first switch control line VSW1 provides a high-level control signal to the first switch device 41 connected thereto, the first switch control line VSW3 provides a high-level control signal to the first switch device 41 connected thereto, the second switch control line TPSW1 provides a low-level control signal to the second switch devices 52 connected thereto, and the second switch control line TPSW3 provides a low-level control signal to the second switch devices 52 connected thereto, so that the second switch devices 52 corresponding to the first electrode column 81 and the third electrode column 83 in each electrode column group 20 respectively are turned off and the first switch devices 41 corresponding to the same electrode columns are turned on, and the common voltage lines VCOMA and VCOMC provide pulse signals to the first electrode column 81 and the third electrode column 83 through the first signal lines 31.

In the second touch stage T23, the first switch control line VSW3 provides a low-level control signal to the first switch device 41 connected thereto, and the second switch control line TPSW3 provides a high-level control signal to the second switch devices 52 connected thereto, so that the second switch devices 52 corresponding to the third electrode column 83 in each electrode column group 20 are turned on and the first switch device 41 corresponding to the same electrode column is turned off, and the touch signal terminal groups 60 provide a touch detection signal to the third electrode column 83 through the second signal line 32; and at the same time, the first switch control line VSW1 provides a high-level control signal to the first switch device 41 connected thereto, the first switch control line VSW2 provides a high-level control signal to the first switch device 41 connected thereto, the second switch control line TPSW1 provides a low-level control signal to the second switch devices 52 connected thereto, and the second switch control line TPSW2 provides a low-level control signal to the second switch devices 52 connected thereto, so that the second switch devices 52 corresponding to the first electrode column 81 and the second electrode column 82 in each electrode column group 20 are turned off and the first switch devices 41 corresponding to the same electrode column are turned on, and the common voltage lines VCOMA and VCOMB provide pulse signals to the first electrode column 81 and the second electrode column 82 through the first signal lines 31.

In the prior art, when a touch detection signal is provided to a certain electrode column, there is the capacitive coupling effect between the first electrode in the electrode column receiving the touch function detection signal and the first electrode in the adjacent electrode column. Therefore, when a touch occurs, the signal read back by the first electrode column to the integrated circuit may be distorted, reducing the accuracy of touch detection. Therefore, in the touch phase T2, according to the present application, the touch detection signals are provided to at least one electrode column in the same electrode column group 20 while the pulse signals are sent to other electrode columns in the same electrode column group 20, and the pulse signals have the same waveform as the touch detection signals, which can avoid the capacitive coupling effect between the first electrodes in two adjacent electrode columns, to facilitate reducing the influence of the electrode columns that do not receive touch detection signals on the signals of the first electrodes in the electrode column that is undergoing the touch detection during the touch phase T2, and thus facilitate enhancing the touch detection performance of the array substrate and improving the accuracy of touch detection.

In one embodiment, referring to FIGS. 4 and 5, the common voltage lines VCOM include first common voltage lines VCOMA and second common voltage lines VCOMB, the first switch control lines VSW include first I-type switch control lines VSW1 and first II-type switch control lines VSW2; the second switch control lines TPSW include second I-type switch control lines TPSW1 and second II-type switch control lines TPSW2; the electrode column group 20 includes adjacent odd-numbered electrode columns 25 and even-numbered electrode columns 26; and the touch stage T2 includes a first touch stage T21, where:

in the first touch phase T21, a second I-type switch control line TPSW1 provides a high-level control signal to second switch devices 52 connected thereto to turn on the respective connected second switch devices 52, a first I-type switch control line VSW1 provides a low-level control signal to first switch devices 41 connected thereto to turn off the respective connected first switch devices 41, and a touch signal terminal group 60 provides the touch detection signal to an odd-numbered electrode column 25; and at the same time, a second II-type switch control line TPSW2 provides a low-level control signal to second switch devices 52 connected thereto to turn off the respective connected second switch devices 52, a first II-type switch control line VSW2 provides a high-level control signal to first switch device 41 connected thereto to turn on each connected first switch device 41, and a second common voltage line VCOMB provides the pulse signal to an even-numbered electrode column 26.

In one embodiment, in the first touch stage T21, the second I-type switch control line TPSW1 provides a high-level signal, and the first electrodes 22 of all odd-numbered electrode columns 25 receive the touch detection signals provided by the touch signal terminal group 60; and at the same time, the second II-type switch control line TPSW2 provides a low-level signal, and the first electrodes 22 of all even-numbered electrode columns 26 cannot receive the touch detection signals. At this time, the first I-type switch control line VSW1 provides a low-level signal, the first electrodes 22 of all odd-numbered electrode columns 25 are independent of each other, the first II-type switch control line VSW2 provides a high-level signal, and the second common voltage line VCOMB provides pulse signals to all even-numbered electrode columns 26. In the touch phase T2, in the present application, the pulse signals and the touch detection signal sent to the odd-numbered electrode column 25 and the even-numbered electrode column 26 in the same electrode column group 20 have the same waveform, which can avoid the capacitive coupling effect between the first electrodes 22 in two adjacent electrode columns 21, to facilitate reducing the influence of the electrode columns 21 that do not receive touch detection signals on the signals of the first electrodes 22 in the electrode column 21 that is undergoing the touch detection during the touch phase T2, and thus facilitate enhancing the touch detection performance of the array substrate 100 and improving the accuracy of touch detection.

In one embodiment, with continued reference to FIG. 4 and FIG. 5, the touch phase T2 further includes a second touch phase T22, where:

in the second touch phase T22, a second I-type switch control line TPSW1 provides a control signal to second switch devices 52 connected thereto to turn off each second switch device 52 connected thereto, a first I-type switch control line VSW1 provides a control signal to a first switch device 41 connected thereto to turn on the first switch device 41 connected thereto, and a first common voltage line VCOMA provides the pulse signal to an odd-numbered electrode column 25; and at the same time, a second II-type switch control line TPSW2 provides a control signal to second switch devices 52 connected thereto to turn on each second switch device 52 connected thereto, a first II-type switch control line VSW2 provides a control signal to a first switch device 41 connected thereto to turn off the first switch device 41 connected thereto, and a touch signal terminal group 60 provides the touch detection signal to an even-numbered electrode column 26.

In one embodiment, in the second touch stage T22, the second II-type switch control line TPSW2 provides a high-level signal, and the first electrodes 22 of all even-numbered electrode columns 26 receive the touch detection signals provided by the touch signal terminal group 60; and at the same time, the second I-type switch control line TPSW1 provides a low-level signal, and the first electrodes 22 of all odd-numbered electrode columns 25 cannot receive the touch detection signals. At this time, the first II-type switch control line VSW2 provides a low-level signal, the first electrodes 22 of all even-numbered electrode columns 26 are independent of each other, the first I-type switch control line VSW1 provides a high-level signal, and the first common voltage line VCOMA provides pulse signals to all odd-numbered electrode columns 25. In the touch phase T2, in the present application, the pulse signals and the touch detection signals provided to the odd-numbered electrode column 25 and the even-numbered electrode column 26 in the same electrode column group 20 have the same waveform, which can avoid the capacitive coupling effect between the first electrodes 22 in two adjacent electrode columns 21, to facilitate reducing the influence of the electrode columns 21 that do not receive touch detection signals on the signals of the first electrodes 22 in the electrode column 21 that is undergoing the touch detection during the touch phase T2, and thus facilitate enhancing the touch detection performance of the array substrate 100 and improving the accuracy of touch detection.

In one embodiment, referring to FIGS. 4 and 5, the driving method provided in the embodiment of the present application further includes a driving method of the display phase T1, where:

in the display phase T1, a second I-type switch control line TPSW1 provides a low-level control signal to second switch devices 52 connected thereto to turn off each second switch device 52 connected thereto; a second II-type switch control line TPSW2 provides a low-level control signal to second switch devices 52 connected thereto to turn off each second switch device 52 connected thereto; a first I-type switch control line VSW1 provides a control signal to a first switch device 41 connected thereto to turn on the first switch device 41 connected thereto; a first II-type switch control line VSW2 sends a control signal to a first switch device 41 connected thereto to turn on the first switch device 41 connected thereto; a first common voltage line VCOMA provides a common voltage signal to an odd-numbered electrode column 25, and a second common voltage line VCOMB provides a common voltage signal to an even-numbered electrode column 26.

In one embodiment, in the display phase T1, both the second I-type switch control line TPSW1 and the second II-type switch control line TPSW2 provide the low-level signals to the second switch devices 52 connected thereto to turn off each second switch device 52; and at the same time, both the first I-type switch control line VSW1 and the first II-type switch control line VSW2 provide the high-level signals to the first switch devices 41 connected thereto to turn on each first switch device 41, the first common voltage line VCOMA provides a common voltage signal to the odd-numbered electrode columns 25, and the second common voltage line VCOMB provides a common voltage signal to the even-numbered electrode columns 26.

In the display stage T1, the first electrode 22 is used as a common electrode to receive the common voltage signal; and in the touch stage T2, the first electrode 22 is used as a touch electrode to receive the touch detection signal or pulse signal. The mode in which the first electrode 22 is used as common electrode or the touch electrode in different phases is beneficial to simplify the film structure on the array substrate 100, simplifying the production process of the array substrate 100 and improving the production efficiency of the array substrate 100.

In one embodiment, referring to FIG. 5, both the first touch stage T21 and the second touch stage T22 are located between two adjacent display stages T1 simultaneously. If the display stage T1 is set between the first touch stage T21 and the second touch stage T22, when the array substrate 100 is touched, the electrode column 21 corresponding to the array substrate 100 may not begin to receive the touch detection signal, but may take a while to receive the touch detection signal, thus reducing the touch sensitivity of the array substrate 100. In the present application, the touch phase T2 composed of the first touch phase T21 and the second touch phase T22 and the display phase T1 are alternately performed, that is to say, the display stage T1 is not set between the first touch phase T21 and the second touch phase T22, which is beneficial to improve the touch sensitivity of the array substrate 100 and enhance the user's touch experience effect.

Figure 11:
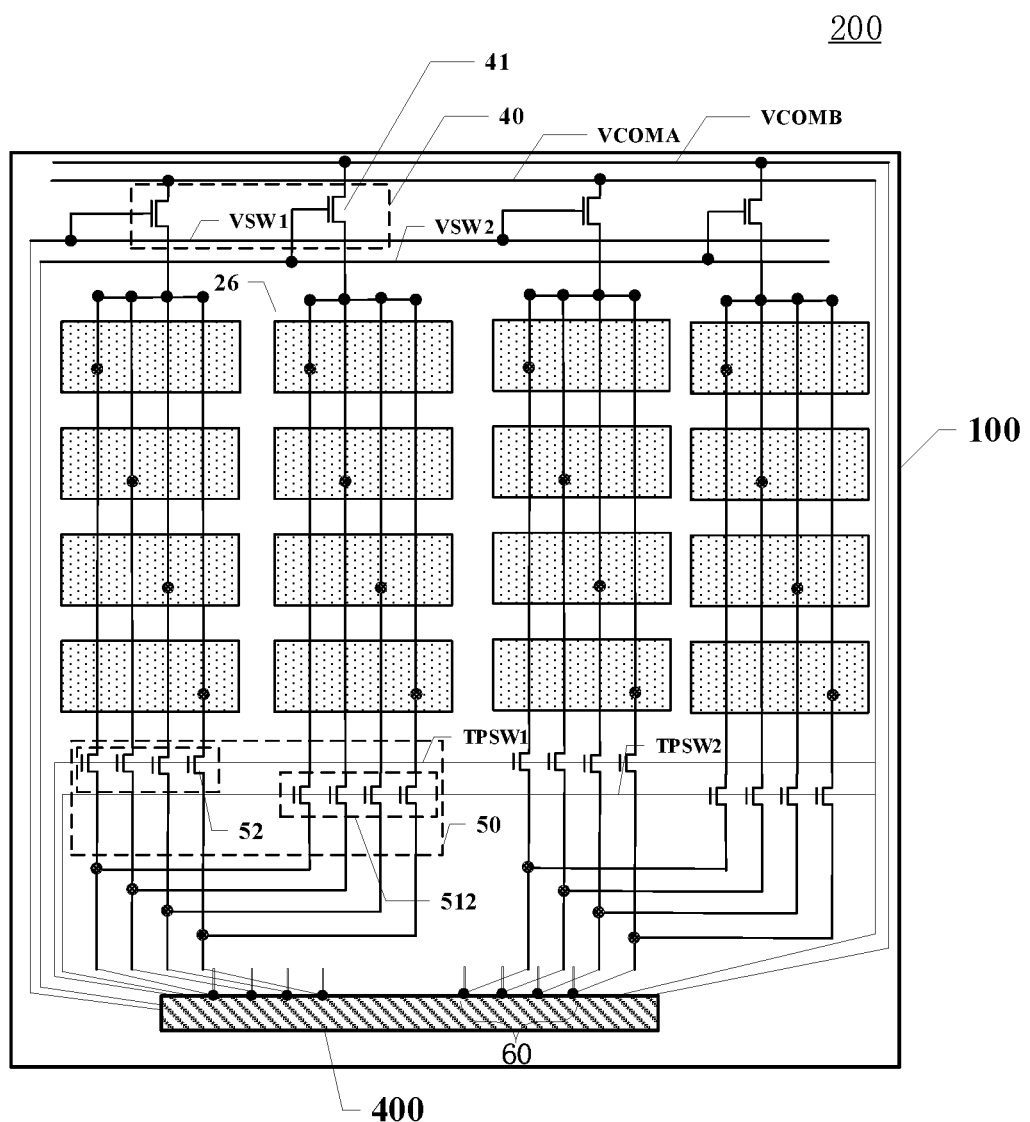
FIG. 11 is a structural schematic diagram of a display panel according to an embodiment of the present application.

Based on the same inventive concept, the present application further provides a display panel 200. Referring to FIG. 11 which is a structural schematic diagram of the display panel 200 according to an embodiment of the present application, the display panel 200 includes a driver chip 400 and any array substrate 100 according to the above embodiments of the present application; the driving chip 400 is bonded to the non-display area, and is located on the same side of the display area as the second switch control lines, the second switch device groups and the touch signal terminal groups at the same time as shown in FIG. 2 and FIG. 3; and the touch signal terminals in each touch signal terminal group 60 are electrically connected to the driver chip 400 respectively. The embodiments of the display panel 200 provided in the embodiment of the present application can refer to the embodiments of the array substrate 100 described above, and the repeated description thereof will be omitted here.

Figure 12:
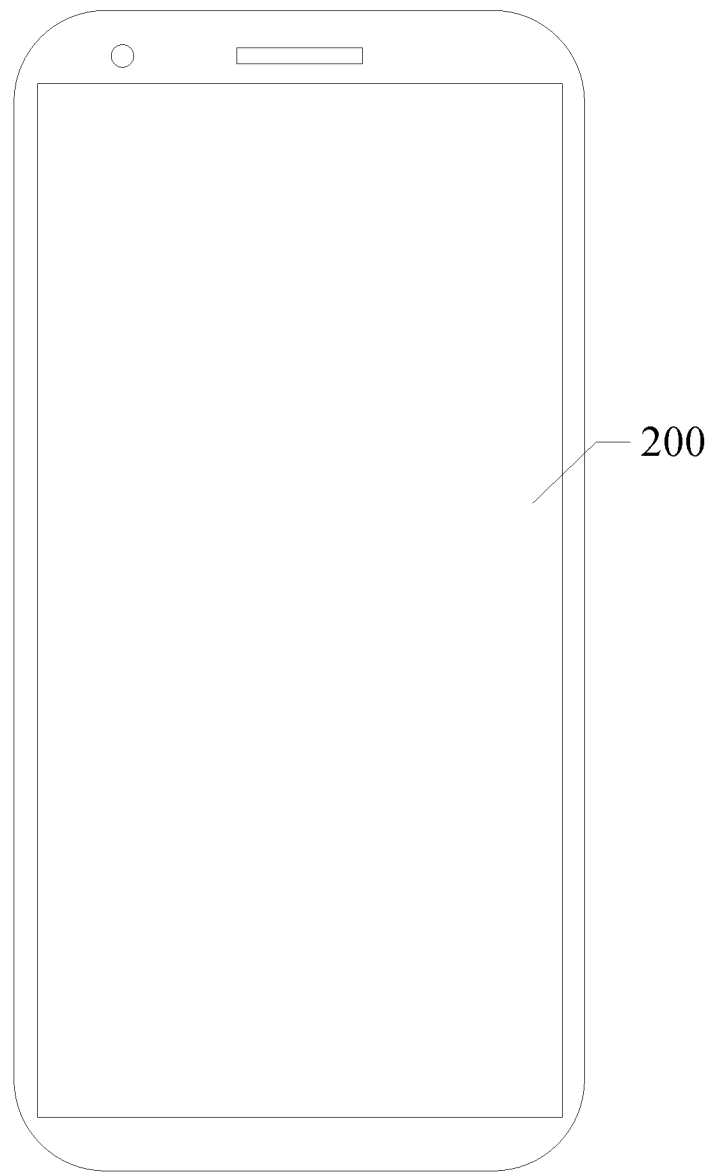
FIG. 12 is a structural schematic diagram of a touch display device according to an embodiment of the present application.

Based on the same inventive concept, the present application further provides a touch display device 300. Referring to FIG. 12, which is a structural schematic diagram of the touch display device 300 according to an embodiment of the present application, the touch display device 300 includes the display panel 200 provided by the embodiment of the present application. The embodiments of the touch display device 300 provided in the embodiment of the present application can refer to the embodiments of the array substrate 100 described above, and the repeated description thereof will be omitted here. The touch display device 300 provided in the present application may be: a mobile phone, a tablet, a television, a display, a laptop, a digital photo frame, or any other product or component with display function.

It should be noted that, in addition to being implemented as the above-mentioned product or component with display function, the touch display device 300 provided by the present application may also be applied to the field of vehicle display, and for example, may be used as a vehicle-carried navigator or other vehicle-carried display screen, etc.

It can be seen from the foregoing embodiments that the array substrate and the driving method, the display panel and the touch display device provided by the disclosure achieve at least the following beneficial effects.

In the array substrate, the display panel and the touch display device provided in the present application, M second switch control lines, second switch device groups and touch signal terminal groups are introduced in the non-display area of the array substrate, where the number of touch signal terminals contained in each touch signal terminal group is the same as the number of first electrodes contained in one electrode column. In particular, the same touch signal terminal group can provide touch detection signals to M adjacent electrode columns in the same electrode column group respectively, that is to say, the first electrodes in M electrode columns share one touch signal terminal group. Compared with the solution in the prior art in which the number of touch signal terminals and the number of touch electrodes are in the one-to-one manner, the method of sharing the touch signal terminal group in the present application greatly reduces the number of touch signal terminals, greatly reducing the number of traces drawn from the touch signal terminals. When the number of traces in the non-display area (i.e., frame area) of the array substrate is reduced, the width of the frame can be reduced to a certain extent, thus facilitating the realization of the narrow bezel design.

In the driving method of the array substrate provided in the present application, in the touch phase, in each electrode column group, at least one electrode column receives the touch detection signal, at least one electrode column receives the pulse signal, and the touch detection signal and the pulse signal have the same waveform, to facilitate reducing the influence of the electrode columns that do not receive touch detection signals on the signals of the first electrodes in the electrode column that is undergoing the touch detection during the touch phase, and thus facilitate enhancing the touch detection performance of the array substrate and improving the accuracy of touch detection.

What is claimed is:

1. An array substrate, having a display area and a non-display area surrounding the display area, and comprising:
   a plurality of electrode column groups arranged in a first direction, wherein
      each electrode column group comprises M adjacent electrode columns extending in a second direction and arranged in the first direction; and
      each electrode column comprises N first electrodes located in the display area, wherein M≥2, N≥2, and the first direction intersects with the second direction;
   a plurality of touch signal lines, wherein
      each touch signal line comprises a first signal line and a second signal line electrically connected to each other; and
      the first signal line and the second signal line of a same touch signal line are electrically connected to a same first electrode;
   M common voltage lines, M first switch control lines and a plurality of first switch device groups, located in the non-display area, wherein
      each first switch device group comprises M first switch devices; and
      in respective one electrode column group: first electrodes in a same electrode column are connected to a first terminal of a same first switch device via respective first signal lines, second terminals of respective first switch devices in a same first switch device group are respectively connected to different common voltage lines, and gates of the respective first switch devices in the same first switch device group are connected to different first switch control lines;
   and
   M second switch control lines, a plurality of second switch device groups and a plurality of touch signal terminal groups, located in the non-display area, wherein
      each second switch device group comprises M sub-switch device groups, each of which comprises N second switch devices, and each touch signal terminal group comprises N touch signal terminals;
      in respective one electrode column group: respective second signal lines corresponding to the first electrodes are electrically connected to first terminals of respective second switch devices in the second switch device groups in a one-to-one manner;

in a same second switch device group: gates of second switch device in a same sub-switch device group are connected to a same second switch control line, and gates of second switch devices in different sub-switch device groups are respectively connected to different second switch control lines; and N touch signal terminals in a same touch signal terminal group are respectively electrically connected to second terminals of respective N second switch devices in any sub-switch device group in the same second switch device group in a one-to-one manner.

2. The array substrate according to claim 1, wherein M=2, the common voltage lines comprise a first common voltage line and a second common voltage line;

the first switch control lines comprise a first I-type switch control line and a first II-type switch control line;

the second switch control lines comprise a second I-type switch control line and a second II-type switch control line;

each second switch device group comprises a first sub-switch device group and a second sub-switch device group; and the electrode column group comprises adjacent odd-numbered electrode columns and even-numbered electrode columns;

in the same first switch device group:

a gate of a first switch device electrically connected to a first electrode in an odd-numbered electrode column is connected to the first I-type switch control line, and a second terminal thereof is connected to a first common voltage line; and a gate of a first switch device electrically connected to a first electrode in an even-numbered electrode column is connected to the first II-type switch control line, and a second terminal thereof is connected to a second common voltage line;

in a same second switch device group:

a first terminal of each second switch device in a first sub-switch device group is electrically connected to a respective one first electrode in an odd-numbered electrode column;

a first terminal of each the second switch device in a second sub-switch device group is electrically connected to a respective one first electrode in an even-numbered electrode column;

a gate of each second switch device in the first sub-switch device group is connected to a second I-type switch control line;

a gate of each second switch device in the second sub-switch device group is connected to a second II-type switch control line; and each touch signal terminal in the same touch signal terminal group is simultaneously electrically connected to a second terminal of a respective one second switch device in the first sub-switch device group and a second terminal of a respective one second switch device in the second sub-switch device group.

3. The array substrate according to claim 2, wherein in each first sub-switch device group and each second sub-switch device group, respective second switch devices are arranged in sequence in the first direction;

in the odd-numbered electrode column, a first electrode in an $n^{th}$ row is electrically connected to an $n^{th}$ second switch device in the first sub-switch device group via a second signal line; and in the even-numbered electrode column, a first electrode in the $n^{th}$ row is electrically connected to an $n^{th}$ second switch device in the second sub-switch device group via a second signal line;

wherein $1 \leq n \leq N$.

4. The array substrate according to claim 2, wherein in the same touch signal terminal group, two first electrodes electrically connected to a same touch signal terminal are located in different rows.

5. The array substrate according to claim 2, wherein touch signal terminals in the same touch signal terminal group are arranged in sequence in the first direction;

an $m^{th}$ touch signal terminal is electrically connected to an $m^{th}$ first electrode in the odd-numbered electrode column, and is electrically connected to a $(N-m+1)^{th}$ first electrode in the even-numbered electrode column, wherein $1 \leq m \leq N$.

6. The array substrate according to claim 3, wherein touch signal terminals in the same touch signal terminal group are arranged in sequence in the first direction;

an $m^{th}$ touch signal terminal is electrically connected to a second terminal of an $m^{th}$ second switch device in the second sub-switch device group, and is electrically connected to a second terminal of a $(N-m+1)^{th}$ second switch device in the first sub-switch device group, wherein $1 \leq m \leq N$.

7. The array substrate according to claim 1, wherein the common voltage lines, the first switch control lines and the first switch device groups are located in the non-display area at a first side of the display area;

the second switch control lines, the second switch device groups and the touch signal terminal groups are located in the non-display area at a second side of the display area; and the first side is opposite to the second side in the second direction.

8. The array substrate according to claim 1, wherein both the first signal line and the second signal line extend in the second direction, and a first signal line and a second signal line of a touch signal line corresponding to a first electrode are electrically connected to the first electrode through a same connection via hole.

9. The array substrate according to claim 1, wherein each first switch device comprises a first transistor, and each second switch device comprises a second transistor.

10. A method of driving an array substrate, wherein the array substrate, has a display area and a non-display area surrounding the display area, and comprises:

a plurality of electrode column groups arranged in a first direction, wherein each electrode column group comprises M adjacent electrode columns extending in a second direction and arranged in the first direction; and each electrode column comprises N first electrodes located in the display area, wherein $M \geq 2$, $N \geq 2$, and the first direction intersects with the second direction;

a plurality of touch signal lines, wherein each touch signal line comprises a first signal line and a second signal line electrically connected to each other; and the first signal line and the second signal line of a same touch signal line are electrically connected to a same first electrode;

M common voltage lines, M first switch control lines and a plurality of first switch device groups, located in the non-display area, wherein
   each first switch device group comprises M first switch devices; and
   in respective one electrode column group: first electrodes in a same electrode column are connected to a first terminal of a same first switch device via respective first signal lines, second terminals of respective first switch devices in a same first switch device group are respectively connected to different common voltage lines, and gates of the respective first switch devices in the same first switch device group are connected to different first switch control lines;
and
M second switch control lines, a plurality of second switch device groups and a plurality of touch signal terminal groups, located in the non-display area, wherein
   each second switch device group comprises M sub-switch device groups, each of which comprises N second switch devices, and each touch signal terminal group comprises N touch signal terminals;
   in respective one electrode column group: respective second signal lines corresponding to the first electrodes are electrically connected to first terminals of respective second switch devices in the second switch device groups in a one-to-one manner;
   in a same second switch device group: gates of second switch device in a same sub-switch device group are connected to a same second switch control line, and gates of second switch devices in different sub-switch device groups are respectively connected to different second switch control lines; and
N touch signal terminals in a same touch signal terminal group are respectively electrically connected to second terminals of respective N second switch devices in any sub-switch device group in the same second switch device group in a one-to-one manner;
wherein the method comprises in a touch phase:
turning second switch devices corresponding to at least one electrode column in each electrode column group on, and first switch devices corresponding to the same column off; and
providing, by the touch signal terminal groups, touch detection signals to electrode columns electrically connected to the turned-on second switch devices through the second signal lines;
and at a same time:
turning second switch devices corresponding to other electrode columns in each electrode column group off, and first switch devices corresponding to the same column on; and
providing, by the common voltage lines, pulse signals to electrode columns electrically connected to the turned-on first switch devices through first signal lines;
wherein the touch detection signals and the pulse signals have a same waveform.

11. The method according to claim 10,
wherein the common voltage lines comprise a first common voltage line and a second common voltage line, the first switch control lines comprise a first I-type switch control line and a first II-type switch control line; the second switch control lines comprise a second I-type switch control line and a second II-type switch control line; each electrode column group comprises adjacent odd-numbered electrode columns and even-numbered electrode columns;

wherein the touch phase comprises a first touch phase, and the method further comprises in the first touch phase:
turning on a second switch device connecting to the second I-type switch control line by, providing a control signal from the second I-type switch control line to the second switch device connected thereto;
turning off a first switch device connecting to the first I-type switch control line by, providing a control signal from the first I-type switch control line to the first switch device connected thereto; and
providing, by the touch signal terminal group, the touch detection signal to an odd-numbered electrode column;
and at a same time:
turning off a second switch device connecting to the second II-type switch control line by, providing a control signal from the second II-type switch control line to the second switch device connected thereto;
turning on a first switch device connecting to the first II-type switch control line by, providing a control signal from the first II-type switch control line to the first switch device connected thereto, and
providing, by the second common voltage line, the pulse signal to an even-numbered electrode column.

12. The method according to claim 11, further comprising a second touch phase:
turning off a second switch device connecting to the second I-type switch control line by, providing a control signal from the second I-type switch control line to the second switch device connected thereto;
turning on a first switch device connecting to the first I-type switch control line by, providing a control signal from the first I-type switch control line to the first switch device connected thereto, and
providing, by the first common voltage line, the pulse signal to an odd-numbered electrode column;
and at a same time:
turning on a second switch device connecting to the second II-type switch control line by, providing a control signal from the second II-type switch control line to the second switch device connected thereto;
turning off a first switch device connecting to the first II-type switch control line by, providing a control signal from the first II-type switch control line to the first switch device connected thereto; and
providing, by the touch signal terminal group, the touch detection signal to an even-numbered electrode column.

13. The method according to claim 12, further comprises in display stage:
turning each second switch device off by, providing a control signal from the second I-type switch control line to the second switch device connected thereto, and providing a control signal from the second II-type switch control line to the second switch device connected thereto;
turning each first switch device off by, providing a control signal from the first I-type switch control line to the first switch device connected thereto, and providing a control signal from the first II-type switch control line to the first switch device connected thereto; and providing, by the first common voltage line, the common voltage signal to the odd-numbered electrode column, and providing, by the second common voltage line, the common voltage signal to the even-numbered electrode column.

14. The method according to claim 13, wherein the first touch phase and the second touch phase are located between two adjacent display phases simultaneously.

15. A display panel, comprising a driver chip and an array substrate;
   wherein the array substrate, has a display area and a non-display area surrounding the display area, and comprises:
      a plurality of electrode column groups arranged in a first direction, wherein
         each electrode column group comprises M adjacent electrode columns extending in a second direction and arranged in the first direction; and
         each electrode column comprises N first electrodes located in the display area, wherein M≥2, N≥2, and the first direction intersects with the second direction;
      a plurality of touch signal lines, wherein
         each touch signal line comprises a first signal line and a second signal line electrically connected to each other; and
         the first signal line and the second signal line of a same touch signal line are electrically connected to a same first electrode;
      M common voltage lines, M first switch control lines and a plurality of first switch device groups, located in the non-display area, wherein
         each first switch device group comprises M first switch devices; and
         in respective one electrode column group: first electrodes in a same electrode column are connected to a first terminal of a same first switch device via respective first signal lines, second terminals of respective first switch devices in a same first switch device group are respectively connected to different common voltage lines, and gates of the respective first switch devices in the same first switch device group are connected to different first switch control lines;
   and
   M second switch control lines, a plurality of second switch device groups and a plurality of touch signal terminal groups, located in the non-display area, wherein
      each second switch device group comprises M sub-switch device groups, each of which comprises N second switch devices, and each touch signal terminal group comprises N touch signal terminals;
      in respective one electrode column group: respective second signal lines corresponding to the first electrodes are electrically connected to first terminals of respective second switch devices in the second switch device groups in a one-to-one manner;
      in a same second switch device group: gates of second switch device in a same sub-switch device group are connected to a same second switch control line, and gates of second switch devices in different sub-switch device groups are respectively connected to different second switch control lines; and
      N touch signal terminals in a same touch signal terminal group are respectively electrically connected to second terminals of respective N second switch devices in any sub-switch device group in the same second switch device group in a one-to-one manner;
   and
   wherein the driver chip is bonded to the non-display area and is located at a same side of the display area as the second switch control lines, the second switch device groups and the touch signal terminal groups simultaneously; and
   touch signal terminals in each touch signal terminal group are electrically connected to the driver chip respectively.

\* \* \* \* \*